United States Patent
Yoon et al.

(10) Patent No.: US 7,962,014 B2
(45) Date of Patent: Jun. 14, 2011

(54) APPARATUS AND METHOD FOR REPRODUCING VIDEO CONTENTS

(75) Inventors: Kyoung Ro Yoon, Seoul (KR); Yong Joo Kim, Seoul (KR); Sung Bae Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 1094 days.

(21) Appl. No.: 10/849,826

(22) Filed: May 21, 2004

(65) Prior Publication Data

US 2004/0234238 A1      Nov. 25, 2004

(30) Foreign Application Priority Data

May 23, 2003  (KR) .................. 10-2003-0033054

(51) Int. Cl.
 *H04N 5/783* (2006.01)
(52) U.S. Cl. ...................... 386/343; 386/345
(58) Field of Classification Search .............. 386/46, 386/69, 98, 68, 125, 126
See application file for complete search history.

(56) References Cited

U.S. PATENT DOCUMENTS

| | | | | |
|---|---|---|---|---|
| 6,023,552 | A * | 2/2000 | Kunihiro | 386/98 |
| 6,219,837 | B1 * | 4/2001 | Yeo et al. | 725/38 |
| 6,334,022 | B1 * | 12/2001 | Ohba et al. | 386/46 |
| 6,404,978 | B1 * | 6/2002 | Abe | 386/55 |
| 6,427,048 | B2 | 7/2002 | Ito et al. | |
| 6,535,639 | B1 * | 3/2003 | Uchihachi et al. | 382/225 |
| 6,674,955 | B2 * | 1/2004 | Matsui et al. | 386/52 |
| 6,788,882 | B1 * | 9/2004 | Geer et al. | 386/116 |
| 7,292,773 | B2 * | 11/2007 | Angel | 386/68 |
| 7,296,231 | B2 * | 11/2007 | Loui et al. | 715/723 |
| 7,362,949 | B2 * | 4/2008 | Jun et al. | 386/68 |
| 2001/0002223 | A1 | 5/2001 | Watanabe | |
| 2002/0012526 | A1 * | 1/2002 | Sai et al. | 386/69 |
| 2002/0144262 | A1 * | 10/2002 | Plotnick et al. | 725/32 |
| 2003/0081937 | A1 * | 5/2003 | Li | 386/52 |
| 2003/0202773 | A1 * | 10/2003 | Dow et al. | 386/46 |
| 2004/0041831 | A1 * | 3/2004 | Zhang | 345/723 |
| 2004/0221237 | A1 * | 11/2004 | Foote et al. | 715/700 |

FOREIGN PATENT DOCUMENTS

| | | |
|---|---|---|
| CN | 1206987 A | 2/1999 |
| EP | 1 182 584 A2 | 2/2002 |
| KR | 10-2002-0023063 A | 3/2002 |
| KR | 10-2002-0088984 A | 11/2002 |

OTHER PUBLICATIONS

Christel et al.; CHI 98, Apr. 18-23, 1998, pp. 171-178, XP-000780789.

* cited by examiner

*Primary Examiner* — Peter-Anthony Pappas
*Assistant Examiner* — Gelek Topgyal
(74) *Attorney, Agent, or Firm* — Birch, Stewart, Kolasch & Birch, LLP

(57) ABSTRACT

A method for reproducing video contents includes the steps of: selecting a reproduction shot from video contents, based on a current location information and a shot index information; determining a reproduction section from the selected reproduction shot; and reproducing the determined reproduction section. After the determined reproduction section is reproduced, the above processes are repeated to next reproduction shots. The repetitive processes are performed all over the video contents until the user requests a reproduction change.

17 Claims, 4 Drawing Sheets

APPARATUS AND METHOD FOR REPRODUCING VIDEO CONTENTS

This Nonprovisional application claims priority under 35 U.S.C. §119(a) on Patent Application No(s). 10-2003-0033054 filed in KOREA on May 23, 2003, the entire contents of which are hereby incorporated by reference.

BACKGROUND OF THE INVENTION

1. Field of the Invention

The present invention relates to an apparatus for reproducing video contents, and more particularly, to a method for reproducing video contents, in which desired screen can be searched automatically at a short time.

2. Description of the Related Art

As multimedia makes rapid progress and video contents are easily manufactured, a quantity of media contents with which general persons come in contact everyday becomes huge.

As video contents become huge, there is a demand for an automated system that can select data desired by a user In order to satisfy the demand, personal video recorder (PVR) that can record/reproduce data at the same time has been recently introduced.

Unlike video cassette recorder (VCR) that stores video signals in a magnetic tape, PVR is an apparatus that records and reproduces on and from hard disk.

PVR can store maximum 30-hour long broadcasting program, record many programs at the same time, receive latest broadcasting schedules on occasion to enable reservation record, and support a variety of Internet-based services.

Also, if channel is selected, PVR automatically stores current broadcast signals in digital format in hard drive and replays the broadcasting at the same time. Accordingly, if a stop button is pressed and then a replay button is again pressed, the stored broadcast signal is again replayed from the stopped point of time.

Additionally, PVR can replay the current broadcasting again, replay it slowly, skip a bored portion, and find or edit a desired portion.

Further, PVR can record several programs at the same time, instantly stop a live broadcasting, and again replays from a scene several seconds or minutes before.

In order to support these various functions, a keyframe interface is proposed which represents video scenes as images to allow the user to view the scenes from desired location. Such a keyframe interface is a means that represents video scenes as images and allows the user to move to a desired location by inputting a location through the images.

Recently, an intelligent skip or dynamic searching function is provided to allow a searching function to a system that permits a simple user interface, such as PVR.

The intelligent skip is a function of moving to a first location of a long shot disposed at closest from a current location using shot information.

The dynamic searching is a function of allowing a user to quickly move to a desired location by replaying some specific sessions at normal speed and other specific sessions at fast speed.

However, such various functions have following problems.

Although high speed fast forward function exhibits great effect at a wide search range, the user feels dizzy on occasion. Also, desired scenes are instantly missed sometimes, so that an accurate location movement is impossible.

Also, a video navigation method using the keyframe has difficulty in displaying a large number of keyframes at a limited space in TV environment. If a very small number of keyframes are provided in order to solve these problems, the number of cases that can shift to an actually desired scene is limited. On the contrary, if a very large number of keyframes are provided, it takes a long time for the user to select a desired keyframe from the keyframes.

In case the intelligent skip is used, if the search range is widened, many inputs are required in order to shift to the desired location.

Also, in case the dynamic searching function is used, fast reproductions are required intermediately. Therefore, the user feels dizzy at a fast replay period, although not more serious than the high speed fast forward function.

Accordingly, there is a demand for an apparatus and method for reproducing video contents, which are capable of fast and accurately searching the user's desired locations.

SUMMARY OF THE INVENTION

Accordingly, the present invention is directed to an apparatus and method for reproducing video contents that substantially obviate one or more problems due to limitations and disadvantages of the related art.

An object of the present invention is to provide an apparatus and method for reproducing video contents, which is capable of automatically searching desired scenes at a short time by reproducing only some sections among reproduction shots that are selected all over the video contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reproducing video contents includes the steps of: selecting a reproduction shot from video contents, based on a current location information and a shot index information; determining a reproduction section from the selected reproduction shot; and reproducing the determined reproduction section.

After the determined reproduction section is reproduced, the above processes are repeated to next reproduction shots. The repetitive processes are performed all over the video contents until the user requests a reproduction change.

Therefore, the user does not feel dizzy and the user's desired scene can be searched through one-time key input, so that a complex user interface is not needed. Further, it is possible to move to the user's desired scene at a wider range in a short time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
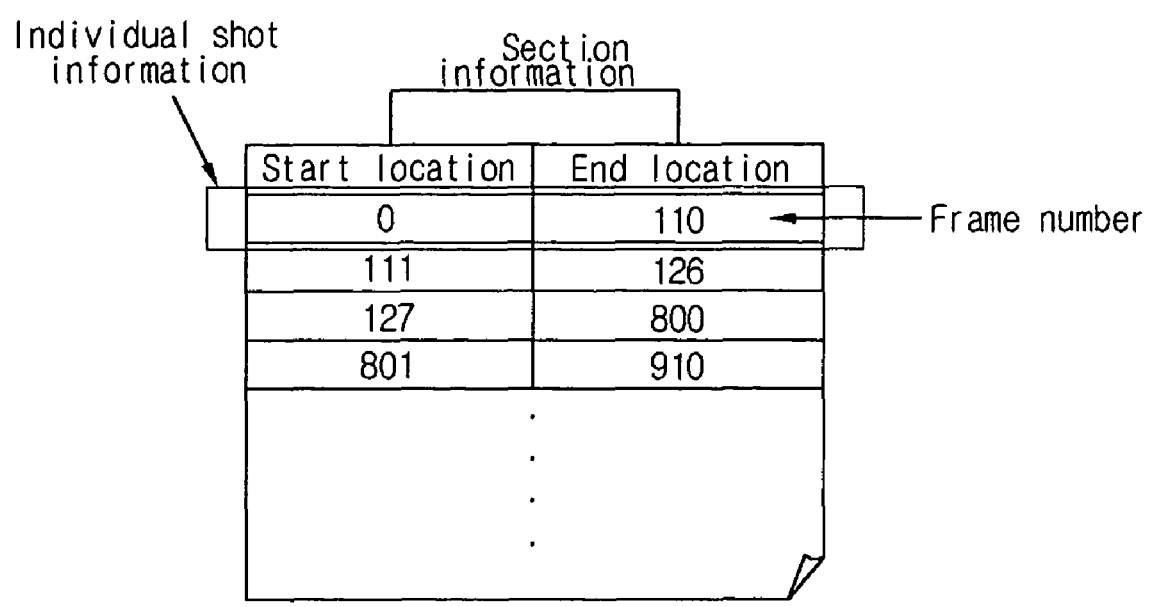
FIG. 1 is an exemplary diagram showing a structure of a general shot index information.

Reference will now be made in detail to the preferred embodiments of the present invention, examples of which are illustrated in the accompanying drawings. Wherever possible, the same reference numbers will be used throughout the drawings to refer to the same or like parts.

As one of methods for analyzing the multimedia contents, video index technologies have been researched for long terms. Among them, a shot segmentation technology has a very high accuracy.

Also, the shot segmentation technology divides the video contents into shots that are a physical edition unit. Most of such shot segmentation technologies have the high accuracy of 95% or more.

Additionally, the shot segmentation technology can be applied to PVR. For example, using the shot segmentation technology, shot index can be generated through the recording and analysis of video contents.

In this invention, on an assumption that a location where a user intends to move in order for a searching or edition is mostly a start location of a certain scene, a shot segmentation information and shot section information applicable regardless of video genres are used.

In other words, the user can easily move to the desired location by reproducing only short segments from a start location of a long shot, which is more than a threshold value.

Since the automatic searching function of the present invention has no high speed replay section, the user does not feel dizzy. Also, since the automatic searching function can be realized using a hot key, it is easy to implement a user interface.

Unlike the related art intelligent skip function, a continuous automatic searching is accomplished through one-time key input. Thus, the searching range becomes wider without demanding the user key input any more. Unlike the related art scheming for the digest replay, it is possible to efficiently skip the consecutive sections of the short shot.

Further, such an automatic searching function can be understood as a method in which a system (for example, PVR) continues to call the related art intelligent skip function according to one-time user request.

If such an automatic searching function is used, it is possible to skip advertisement scenes and to easily and accurately move to the desired location in the contents (e.g., an anchor scene in news program or a first scene of next singer in a music program), which has been impossible in the related art function or inconvenient because of a lot of user input requests or a complexity of the interface.

Further, the automatic searching function of the present invention is not dependent on genres because it does not require scene-based detection. Since the structure of an index generating unit also demands only a scene change detecting module, it is possible to provide the automation having a high accuracy.

The automatic searching function can operate in a client-server environment through the shot segmentation information of the present invention and can operate in an independent system (for example, PVR).

FIG. 1 is an exemplary diagram showing a structure of a general shot index information.

Referring to FIG. 1, a shot index information is constituted with a list of individual shot information, which includes section information of minimum shot. In other words, the shot section information includes a start location and an end location of a corresponding shot.

Also, the individual shot information may include other additional information (a representative frame information, an average motion amount information, etc.)

At this point, time duration or length information can be calculated using the start location and the end location. Meanwhile, the individual shot information may be constituted with a start location and a time duration information.

Figure 2:
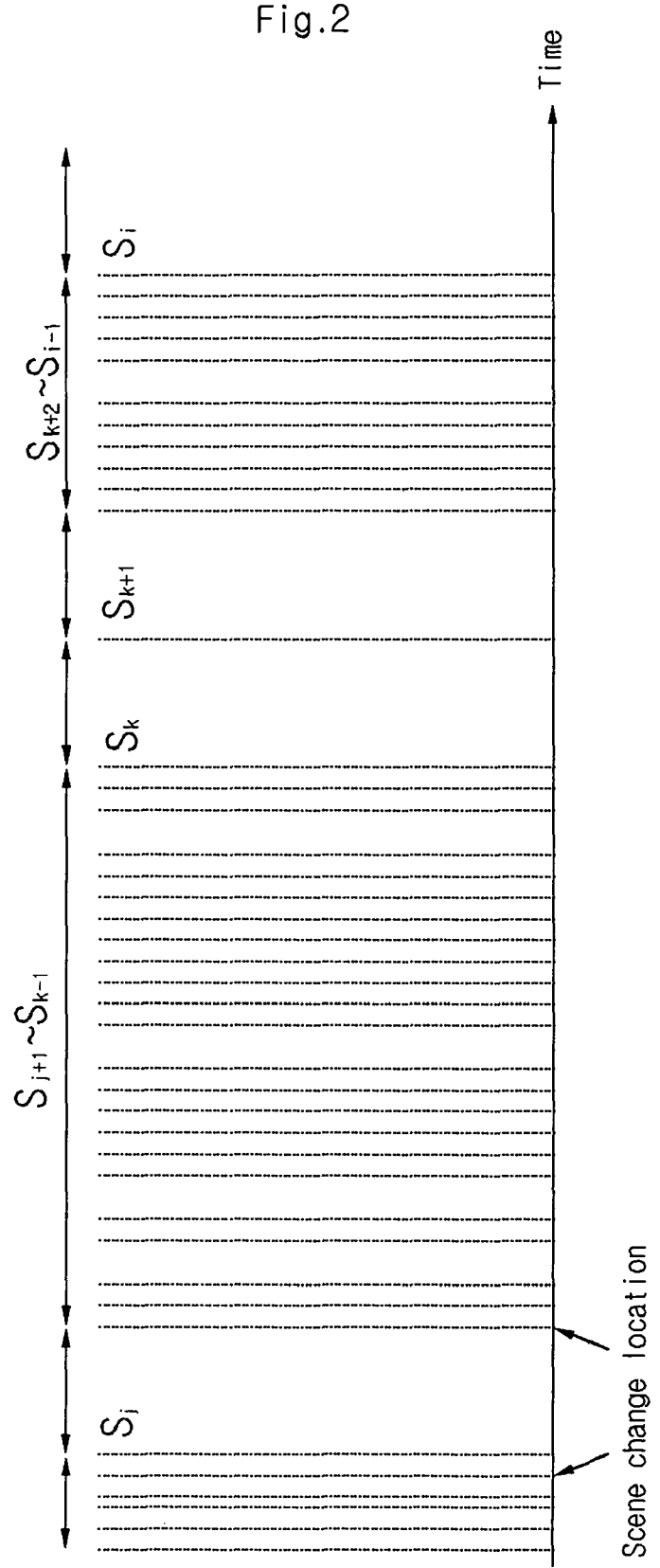
FIG. 2 is a diagram of shots arranged on time axis according to a preferred embodiment of the present invention.

FIG. 2 is a diagram of shots arranged on time axis according to a preferred embodiment of the present invention.

Referring to FIG. 2, shots that are extracted from the video contents are classified into long shots $S_j$, $S_k$, $S_{k+1}$ and $S_i$ and short shots $S_{j+1}$–$S_{k-1}$ and $S_{k+2}$–$S_{i-1}$ based on a predetermined threshold value. Here, Sections $S_{j+1}$–$S_{k-1}$ and sections $S_{k+2}$–$S_{i-1}$ include a plurality of shots.

In order to implement the automatic searching function of the present invention, the shots need to be classified into the long shots and the short shots, as shown in FIG. 2.

At this point, the predetermined threshold value may be previously set in a system (for example, PVR) or may be directly set by the user.

Figure 3:
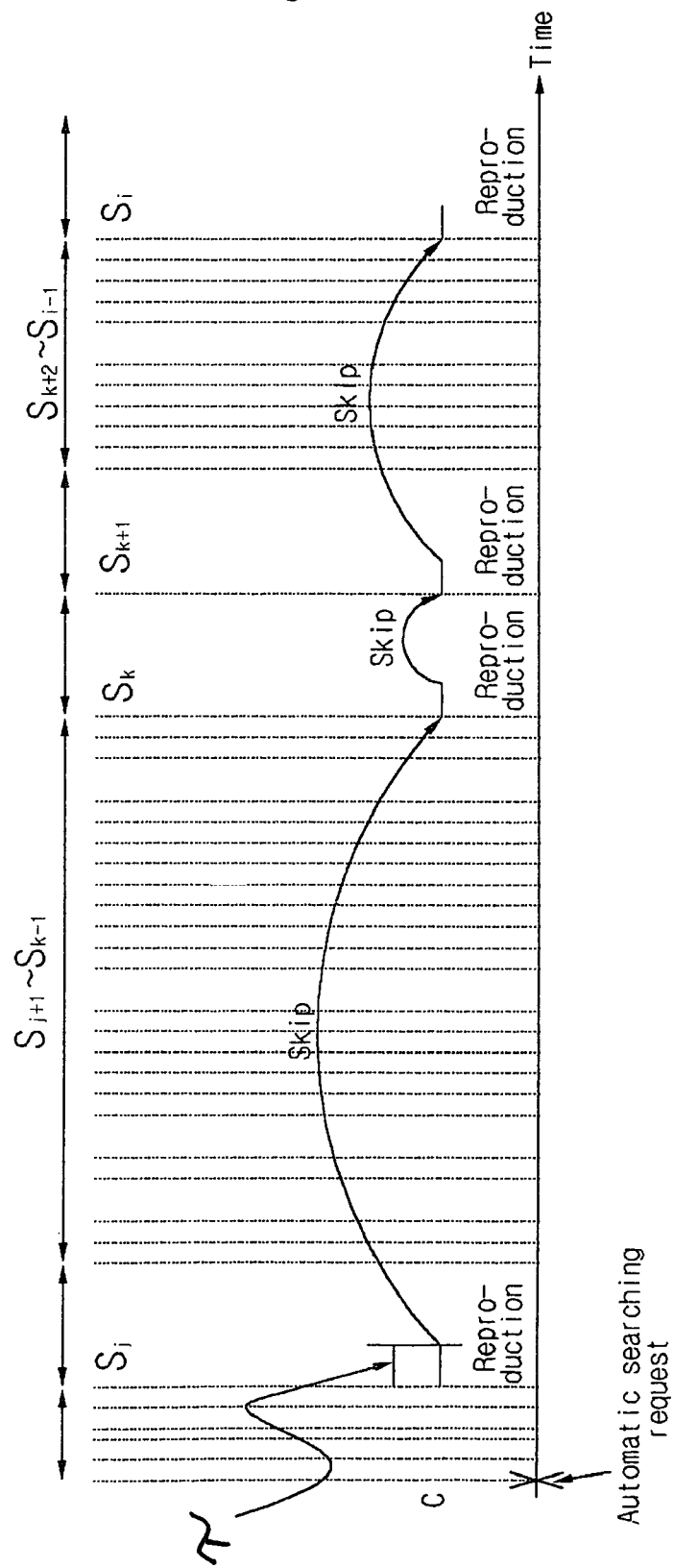
FIG. 3 is a diagram illustrating a concept of an automatic searching method according to a preferred embodiment of the present invention.

FIG. 3 is a diagram illustrating a concept of an automatic searching method according to a preferred embodiment of the present invention.

In FIG. 3, there is exemplarily shown an automatic searching method, which is capable of automatically searching desired scenes through the classification of the long shot and the short shot.

Referring to FIG. 3, if the user requests the automatic searching, the system selects a to-be-reproduced shot from the video contents based on the current location C and the shot index information.

At this point, the shot index information is previously generated from the video contents and is stored.

For example, as shown in FIG. 3, if the user's automatic searching request is a forward request, the system extracts shots $S_j$, $S_k$, $S_{k+1}$ and $S_i$ of more than the predetermined threshold value among the shots that are present in forward direction from the current location C. Among the extracted shots, the shot $S_j$ that is disposed at a closest location from the current location may be selected as the reproduction shot. In case of the forward reproduction, the closest shot may be selected from the shots disposed after the current location. Of course, in case of a reverse reproduction, the closest shot may be selected from the shots disposed before the current location.

If the reproduction shot is selected, the system determines a reproduction section τ at a first half of the reproduction shot $S_j$. For example, in case of the forward reproduction, the reproduction section τ is determined at the first half of the selected reproduction shot. On the contrary, in case of the reverse reproduction, the reproduction section τ is determined at a second half of the selected reproduction shot.

The reason why only a predetermined portion, such as the first half and second half of the corresponding shot, is reproduced is that the fast reproduction and the normal reproduction can be achieved at a time from the desired location when user judges whether the corresponding section of the shot is the desired location and then requests a normal reproduction.

A minimum time must be secured to judge whether such reproduction section is the user's desired location and to issue a command to the system. Also, if the reproduction section is too wide, requirement for fast searching in the wider range is violated, so that the section has to be adjusted to an appropriate range.

It is preferable that a length of the reproduction section is previously set by the user or the system.

If the reproduction section is determined in the above manner, the system reproduces the video contents as much as the determined section.

If the reproduction is completed, that is, if the reproduction is performed up to the end time of the reproduction section, the system considers the end time as a next current location. The above-described procedures are repeated from the new current location. In other words, through these repeated procedures, the respective reproduction sections $S_k$, $S_{k+1}$ and $S_j$ are continuously reproduced. Although the reproduction to the section $S_j$ is shown in FIG. 3, it is preferable to repeat the above procedures all over the video contents.

Accordingly, the user need not request additionally the automatic searching in order to search the long shots. In other words, if the automatic searching is requested at a specific location, the system automatically performs the automatic searching all over the regions of the video contents.

At this point, it is preferable to repeatedly perform the above procedures according to the directionality that is found by the user's searching request. In other words, if a first user requests the forward searching, the system performs a continuous searching in a forward direction from the current location.

If the user requests the reproduction change (for example, normal reproduction from the corresponding location, intelligent skip, fast reproduction, etc.), the current process is stopped to respond the user's request for the reproduction change.

The above-described automatic searching function makes it possible to fast move to the desired location without dizziness at the wider range by overcoming the drawbacks of the intelligent skip, the fast searching, the dynamic skip and the video scheming.

Further, if the user finds the corresponding location using the automatic searching, the reproduction from the current location can be requested to the system. If the corresponding location is passed, the normal reproduction from the corresponding location can be requested to the system at a time using the intelligent skip one time.

In other words, the system continuously calls the intelligent skip using one-time user key input, such that the automatic searching makes it possible to move to the accurate location in the wide searching range within a short time without dizziness.

The PVR to which the automatic searching function is applied will now be described with reference to FIG. 4.

Figure 4:
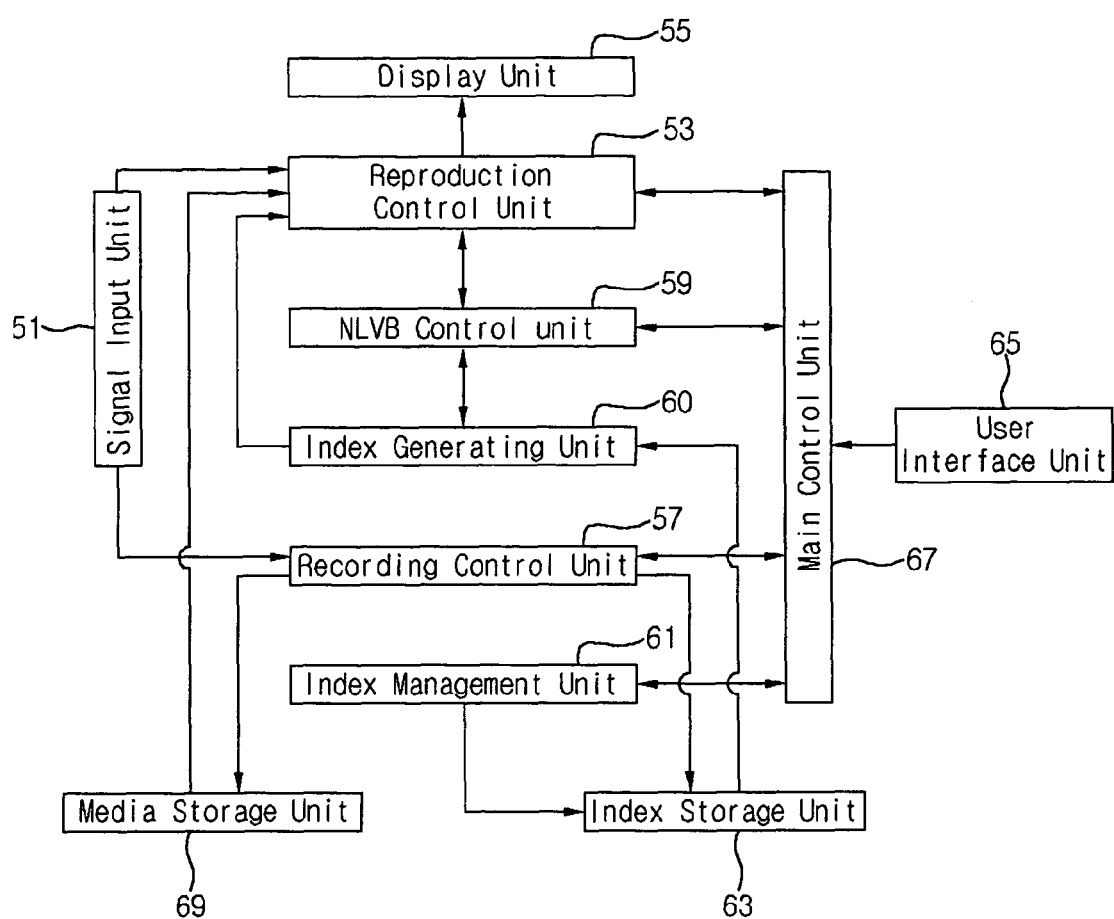
FIG. 4 is a block diagram illustrating a structure of a PVR to which an automatic searching method of the present invention is applied.

FIG. 4 is a block diagram illustrating a structure of a PVR to which the automatic searching function of the present invention is applied.

Referring to FIG. 4, a signal input unit 51 is an input source of digital audio/video signals, and a display unit 52 is an output unit, such as monitor and speaker, for outputting the digital audio/video signals.

A user interface 65 is an input unit, such as keyboard, mouse, remote controller and button, for receiving a user's input.

A reproduction control unit 53 controls to reproduce the video stream inputted through the signal input unit 51 and displays the video stream on the display unit 55. In case the searching request is inputted from the user, the reproduction control unit 53 selects the reproduction shot, which satisfies predetermined conditions, from the video contents based on the current location information and the shot index information. Then, the reproduction control unit 53 controls to perform an operation of reproducing a predetermined section of the selected reproduction shot all over the whole video contents.

Also, the reproduction control unit 53 manages a control of a whole media reproduction. In some cases, the reproduction control unit 53 provides a non-linear video browsing (NLVB) function, including the automatic searching, and a tricky play function through a communication with an NLVB control unit 59 or an index management unit 60.

The NLVB control unit 59 selects the reproduction shot from the video contents in response to the user's automatic searching request under a control of the reproduction control unit 53, determines the reproduction section from the selected reproduction shot, and provides the determined reproduction section to the reproduction control unit 53. At this point, the NLVB control unit 59 reads out the shot index information from an index storage unit 63 through a communication with the index management unit 60 and uses the shot index information to select the user's actually desired location.

The index management unit 60 communicates with the reproduction control unit 53, the NLVB control unit 59 and a main control unit 67 and manages all the shot index information obtained from the video contents. For example, the index management unit 60 takes out the corresponding information from the index storage unit 63 and provides the information to the corresponding control units.

In a record mode, a recording control unit 57 processes the digital video/audio signals, which are inputted through the signal input unit 51, in a form of video contents and stores them into the media storage unit 69. At this point, the recording control unit 57 controls to provide the recorded video contents to the index generating unit 61, generate the shot index information, and store the shot index information into the index storage unit 63.

The index generating unit 61 can use the automatic video indexing to generate the shot index information from the video contents, which are provided under a control of the recording control unit 57, and then store the shot index information into the index storage unit 63.

Here, if the shot index information is directly provided from the contents provider, the index generating unit 61 is not needed.

In the record mode, a media storage unit 69 is an apparatus for storing the video contents inputted through the signal input unit 51. The index storage unit 63 stores the shot index information or the like which is generated from the index generating unit 61.

The main control unit 67 functions to transmit commands relating to reproduction control/record control/automatic searching control/indexing generating control to the respective control units. At this point, the main control unit 67 may control the respective control units according to the commands inputted from the user interface 65. Specifically, the command for the user's automatic searching request is provided to the main control unit 67 through the user interface 65.

The main control unit 67 recognizes the command and transmits it to the reproduction control unit 53 and the NLVB control unit 59.

An automatic searching operation in the video reproducing apparatus will now be described.

If the user inputs the automatic searching request through the user interface 65, the request is transmitted to the main control unit 67. The main control unit 67 determines whether the request is the automatic searching and provides the corresponding control command to the reproduction control unit 53.

The reproduction control unit 53 transmits the control command to the NLVB control unit 59 and controls to execute the corresponding function.

In other words, the NLVB control unit 59 determines whether the video contents requested by the user is the video contents inputted through the signal input unit 51 or the video contents previously stored in the media storage unit 69 according to the control of the reproduction control unit 53, and then, takes the corresponding video contents.

Then, the NLVB control unit 59 selects a first reproduction shot, which satisfies predetermined conditions, from the video contents in response to the automatic searching requested by the user, based on the current location and shot index information. The NLVB control unit 59 determines a first reproduction section for the selected first reproduction shot and transmits the determined first reproduction section to the reproduction control unit 53. Here, the first reproduction shot satisfying the predetermined conditions means a shot that is closest from the current location among the shots, which are extracted from the video contents and are more than a predetermined threshold value.

The reproduction control unit 53 reproduces the first reproduction section determined at the NLVB control unit 59, thereby displaying it through the display unit 55.

At this point, if the user does not request the reproduction change after completing the replay of the first reproduction, the reproduction control unit 53 instructs the NLVB control unit 59 to determine a second reproduction section.

The NLVB control unit 59 recognizes an end time of the first reproduction section as a next current location, based on the command. Then, the NLVB control unit 59 determines a second reproduction section for the second reproduction shot, which is disposed next to the current location, and transmits the second reproduction section to the NLVB control unit 59. Thereafter, the NLVB control unit 59 reproduces the second reproduction section.

These searching procedures are performed all over the whole video contents.

If the user selects a specific shot as the desired scene, the current process is stopped and the normal reproduction from the selected reproduction shot is performed.

In this manner, it is possible to easily move to the desired scene through one-time key input. Also, the dizziness can be prevented.

According to the present invention, the searching process is automatically maintained through one-time key input until the user detects the desired scene. Therefore, the fast searching effect in the wider range can be obtained and a complex user interface is not needed. Also, the user does not feel dizzy and the normal reproduction can be accurately performed from the user's desired location.

Further, according to the present invention, in case the user wants to reproduce the desired scene, the user can request the normal reproduction from its location because the reproduction section is the first location of the corresponding shot. In case the scene is passed, it is possible to easily move to the first location of the desired scene by additionally requesting the reverse intelligent skip.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for reproducing video contents, comprising the steps of:
    in response to a single user search command, performing a video contents intelligent skip based on a shot index and based on a location in the video contents corresponding to when the single user search command is received, the video contents intelligent skip including automatically skipping video contents while simultaneously displaying a contiguous sequence of reproduction shots, contents of each reproduction shot of the contiguous sequence displayed at a content display speed equal to a corresponding content recording speed, each reproduction shot including a leading subset of a corresponding long shot and excluding any subsequent portion of the corresponding long shot, each reproduction shot having a predetermined length less than a total length of the corresponding long shot, the skipped video contents including any short shots between long shots corresponding to the contiguous sequence of reproduction shots; and
    in response to a single user play command received while displaying the contiguous sequence of reproduction shots, stopping the video contents intelligent skip and reproducing the video contents from a position in the contiguous sequence of reproduction shots corresponding to when the user play command is received.

2. The method according to claim 1, wherein the video contents intelligent skip includes a forward intelligent skip and the leading subset is a subset of the corresponding long shot is a leading subset in a forward direction.

3. The method according to claim 1, wherein the video contents intelligent skip includes a reverse intelligent skip and the leading subset is a subset of the corresponding long shot is a leading subset in a reverse direction.

4. The method according to claim 1, further comprising at least one of:
    dividing the video contents into long shots separated by a plurality of short shots;
    displaying information corresponding to a current location within the video contents; and
    generating and storing the shot index.

5. The method according to claim 1, further comprising:
    determining the predetermined length based upon a corresponding user input.

6. The method according to claim 1, wherein the predetermined length is a common length for all reproduction shots.

7. The method according to claim 1, wherein the step of stopping the video contents intelligent skip comprises:
    storing a last display position of the video contents intelligent skip for use as a beginning position for a subsequent initiation of the video contents intelligent skip.

8. The method according to claim 1, further comprising:
    repeatedly performing the step of automatically displaying a sequence of reproduction shots.

9. A video reproducing apparatus configured to reproduce video contents, comprising:
    an input unit configured to receive user inputs;

a control unit operatively connected to the input unit and configured to in response to a single user search command, perform a video contents intelligent skip based on a shot index and based on a location in the video contents corresponding to when the single user search command is received, the video contents intelligent skip including automatically skipping video contents while simultaneously displaying a contiguous sequence of reproduction shots, contents of each reproduction shot of the contiguous sequence displayed at a content display speed equal to a corresponding content recording speed, each reproduction shot including a leading subset of a corresponding long shot and excluding any subsequent portion of the corresponding long shot, each reproduction shot having a predetermined length less than a total length of the corresponding long shot, the skipped video contents including any short shots between long shots corresponding to the contiguous sequence of reproduction shots; and in response to a single user play command received while displaying the contiguous sequence of reproduction shots, stop the video contents intelligent skip and reproducing the video contents from a position in the contiguous sequence of reproduction shots corresponding to when the user play command is received.

10. The video reproducing apparatus according to claim 9, further comprising:

a media storage unit configured to store the video contents;

an index storage unit configured to store the shot index; and a display unit configured to display the video contents, the media storage unit, the index storage unit and the display unit each operatively connected to the control unit.

11. The video reproducing apparatus according to claim 9, wherein the video contents intelligent skip includes a forward intelligent skip and the leading subset is a subset of the corresponding long shot is a leading subset in a forward direction.

12. The video reproducing apparatus according to claim 9, wherein the video contents intelligent skip includes a reverse intelligent skip and the leading subset is a subset of the corresponding long shot is a leading subset in a reverse direction.

13. The video reproducing apparatus according to claim 9, wherein the controller is configured to divide the video contents into long shots separated by a plurality of short shots;

display information corresponding to a current location within the video contents; and generate and store the shot index.

14. The video reproducing apparatus according to claim 9, wherein the controller is configured to determine the predetermined length based upon a corresponding user input.

15. The video reproducing apparatus according to claim 9, wherein the predetermined length is a common length for all reproduction shots.

16. The video reproducing apparatus according to claim 9, wherein the wherein the controller is configured to store a last display position of the video contents intelligent skip for use as a beginning position for a subsequent initiation of the video contents intelligent skip.

17. The video reproducing apparatus according to claim 9, wherein the controller is configured to repeatedly perform the step of automatically displaying a sequence of reproduction shots.

* * * * *